United States Patent
Kobayashi et al.

(10) Patent No.: US 8,585,117 B2
(45) Date of Patent: Nov. 19, 2013

(54) VEHICLE GLOVE BOX

(75) Inventors: Kouzou Kobayashi, Saitama (JP); Tomohiko Nara, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/501,810

(22) PCT Filed: Oct. 5, 2010

(86) PCT No.: PCT/JP2010/067440
§ 371 (c)(1),
(2), (4) Date: Apr. 13, 2012

(87) PCT Pub. No.: WO2011/046042
PCT Pub. Date: Apr. 21, 2011

(65) Prior Publication Data
US 2012/0200107 A1 Aug. 9, 2012

(30) Foreign Application Priority Data
Oct. 16, 2009 (JP) .................. 2009-239301

(51) Int. Cl.
*B60R 7/04* (2006.01)
(52) U.S. Cl.
USPC ....................................... 296/37.12
(58) Field of Classification Search
USPC ....................................... 296/37.12
See application file for complete search history.

(56) References Cited

U.S. PATENT DOCUMENTS 5,385,378 A 1/1995 Hakamada et al.
5,639,116 A 6/1997 Shimizu et al.

FOREIGN PATENT DOCUMENTS

| FR | 2735725 | * | 12/1996 |
| JP | 55-062446 U | | 4/1980 |
| JP | 57-204951 U | | 12/1982 |
| JP | 6-107074 A | | 4/1994 |
| JP | 7-291079 A | | 11/1995 |
| JP | 2009-107581 A | | 5/2009 |
| JP | 2009-214725 A | | 9/2009 |

* cited by examiner

*Primary Examiner* — Dennis Pedder
(74) *Attorney, Agent, or Firm* — Carrier Blackman & Associates, P.C.; William D. Blackman; Michael J. McCandlish

(57) ABSTRACT

The present invention provides a vehicle glove box (1) that enables easy reading of a serial code of an airbag device. The vehicle glove box (1) is installed in a vehicle instrument panel (IP) and includes a storage unit (10) for having goods to be stored therein. The storage unit (10) includes a second opening (11b) and a second lid (40) for opening and closing the second opening (11b). The opening (11b) is formed to face both an air conditioner filter (F) and a serial code (SC) of an airbag device (AB).

18 Claims, 5 Drawing Sheets

VEHICLE GLOVE BOX

TECHNICAL FIELD

The present invention relates to a vehicle glove box installed in a vehicle instrument panel for having goods to be stored therein.

BACKGROUND ART

In a vehicle instrument panel, there is installed a glove box for a vehicle passenger to store goods therein. Such a glove box is provided with an opening for replacement of a filter of an air conditioner installed in the instrument panel and with a lid for opening and closing the opening (See Patent Document 1).

PRIOR ART DOCUMENT

Patent Document

[Patent Document 1] Japanese Unexamined Publication Application No. 2009-107581

SUMMERY OF THE INVENTION

Problem that the Invention is to Solve

In the vehicle instrument panel, there is also installed a front passenger seat airbag device with a specific serial code carried thereon. In some cases, the serial code SC is read after the instrument panel IP with the glove box 1 is mounted into the vehicle on a factory assembly line. The glove box, once installed in the instrument panel, therefore, has had to be removed from the instrument panel for the reading of the serial code.

The present invention has been made to solve the above problem, and it is an object of the present invention to provide a vehicle glove box that enables easy reading of a serial code on an airbag device.

Means for Solving the Problem

The present invention provides a vehicle glove box installed in a vehicle instrument panel and comprising a storage unit for having goods to be stored therein, the storage unit including an opening and a lid for opening and closing the opening, the opening being formed to face both an air conditioner filter and a serial code of an airbag.

The above configuration, in which the opening is formed in the location facing not only the air conditioner filter but also the serial code of the airbag, enables easy reading of the serial code of the airbag device by opening the lid.

It is preferable that the storage unit has a hole and the lid has a fit portion for fitting in the hole, the fit portion fitting in the hole for the lid to be held on the storage unit with the lid in an opened state thereof.

The above configuration prevents the lid from dropping off from the storage unit and thereby from being lost.

Further, it is preferable that the opening is formed in a position from a front face of the storage unit to an upper face thereof.

The above configuration allows easy replacement of the air conditioner filter which, in general, is installed in front of the front face of the vehicle glove box. Further, the above configuration allows easy reading of the serial code of the airbag which, in general, is located above the upper face of the vehicle glove box.

Moreover, it is preferable that the fit portion is formed on a lower edge of the lid.

The above configuration allows gravity to keep the fit portion fitting in the hole formed through the storage unit, so that the lid stays out of the way of replacement of the filter and reading of the serial code.

Effect of the Invention

A glove box according to the present invention enables easy reading of a serial code of an airbag.

MODE FOR CARRYING OUT THE INVENTION

In the following paragraphs, description will be made of an embodiment of the present invention with reference to the drawings. Same components are denoted by same References, and duplicate descriptions are omitted. The following directional terms "front, rear, upper, lower, right, and left" refer to those directions from the passenger.

<Configuration of Vehicle Glove Box>

Figure 1:
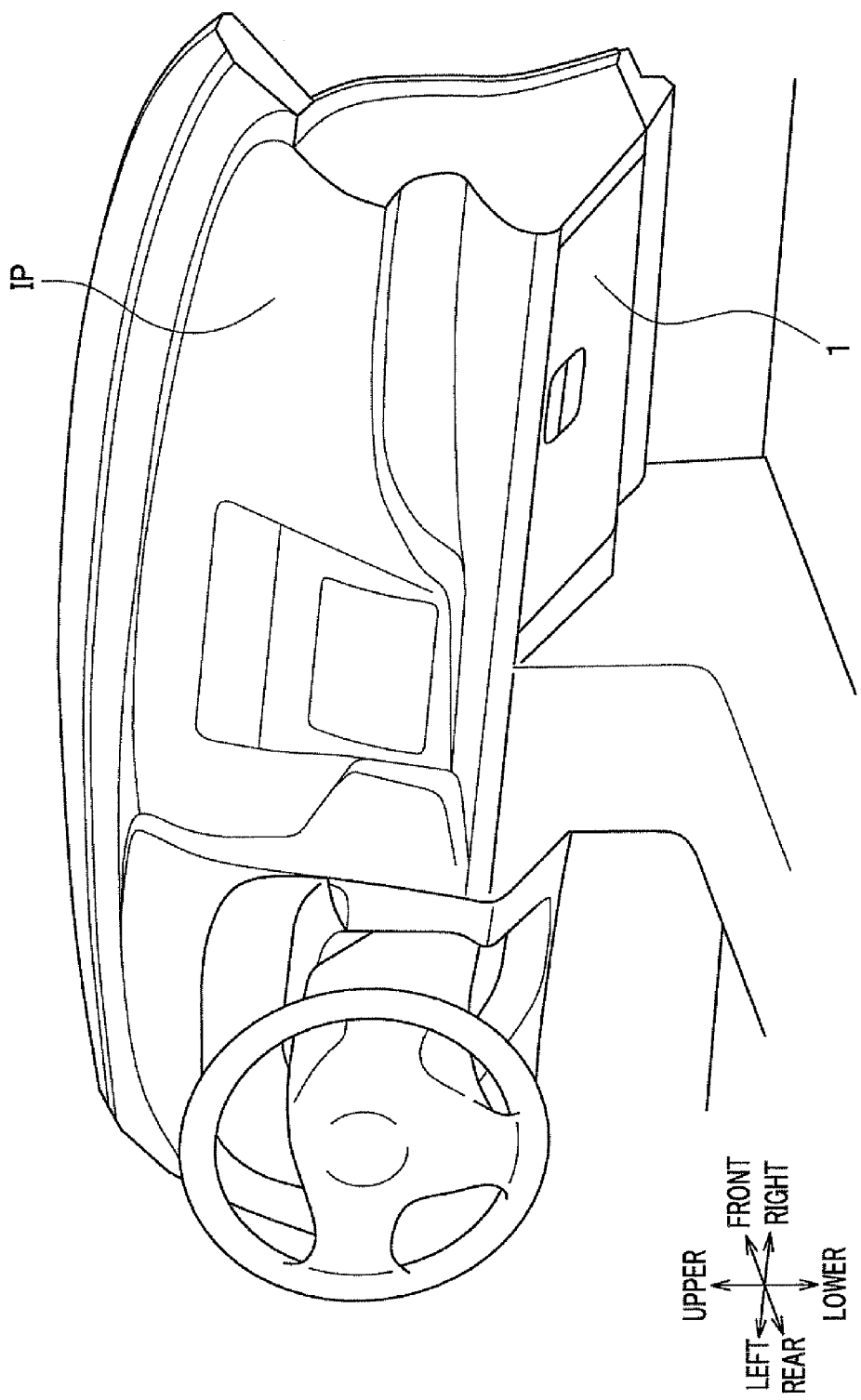
FIG. 1 is a view showing a state in which a vehicle glove box according to the embodiment is installed in an instrument panel.
Figure 2:
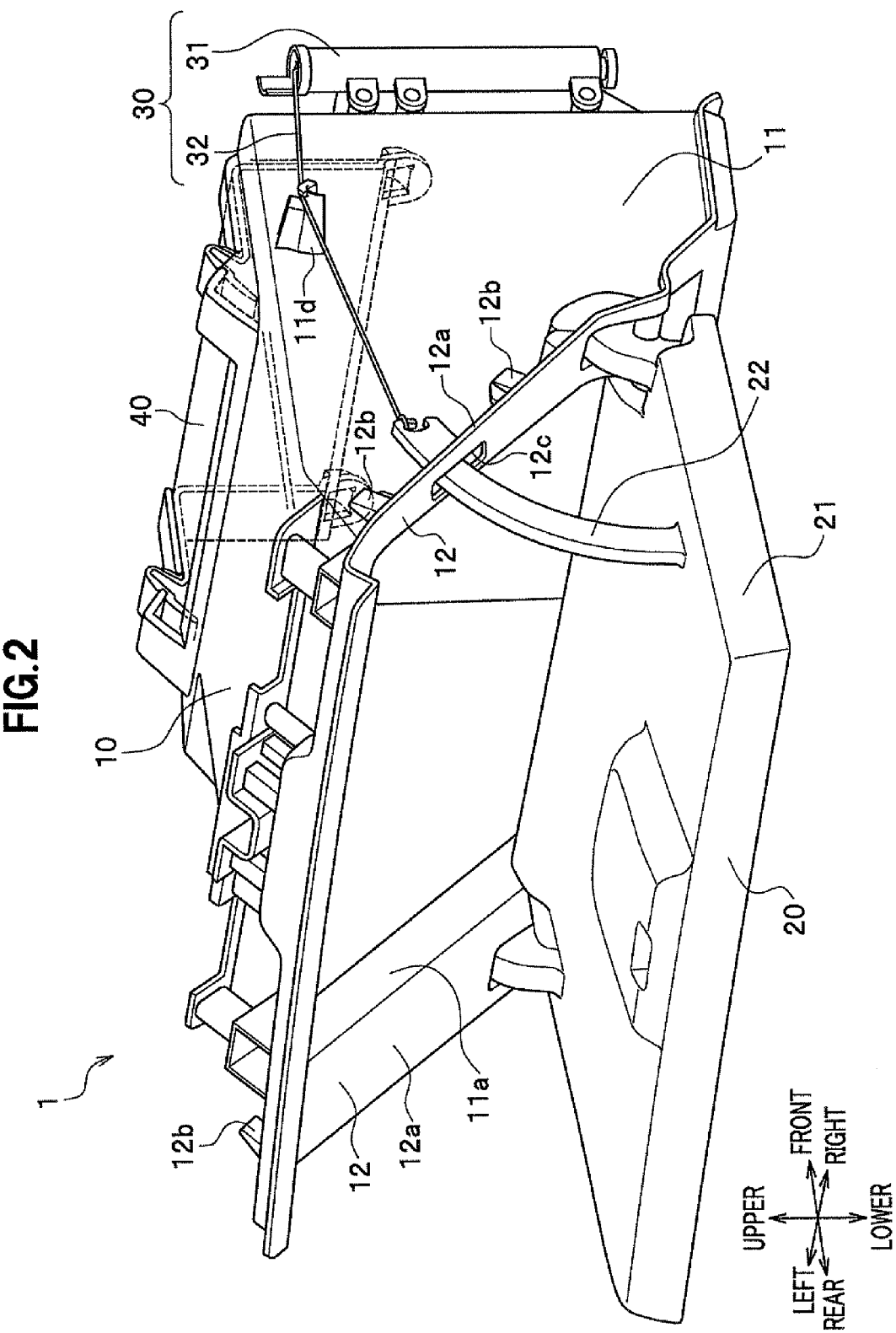
FIG. 2 is a perspective view showing the vehicle glove box of FIG. 1 with a second lid attached thereto.
Figure 3:
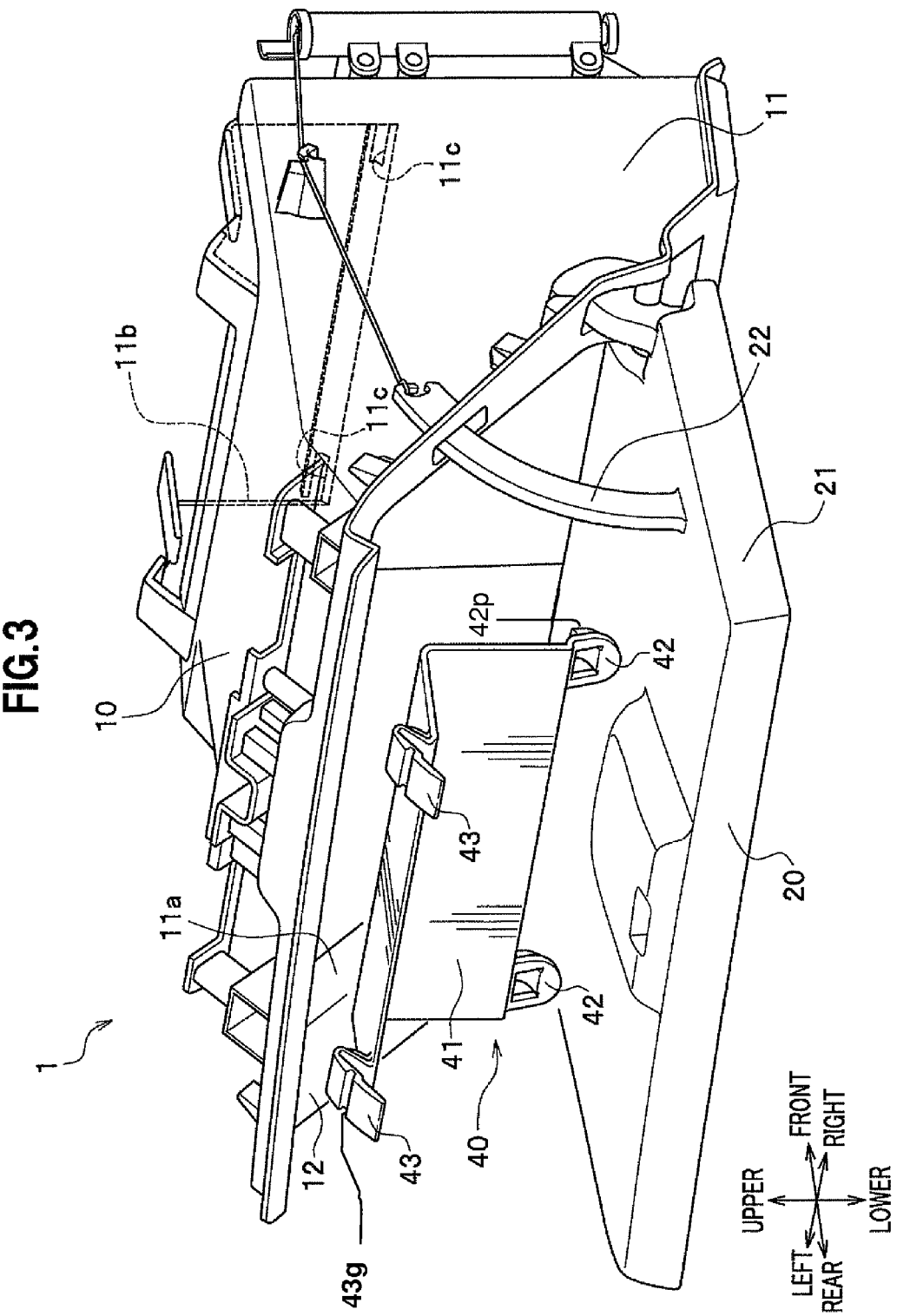
FIG. 3 is a perspective view showing the vehicle glove box of FIG. 1 with the second lid detached therefrom.

First, description will be made of the configuration of a vehicle glove box according to an embodiment of the present invention with reference to FIGS. 1-3. FIG. 1 is a view showing a state in which the vehicle glove box according to the embodiment is installed in an instrument panel. FIG. 2 is a perspective view showing the vehicle glove box of FIG. 1 with a second lid attached thereto. FIG. 3 is a perspective view showing the vehicle glove box of FIG. 1 with the second lid detached therefrom.

As shown in FIG. 1, a vehicle glove box 1 according to an illustrative embodiment of the present invention is fixed in an opening formed in a vehicle instrument panel IP in front of the front passenger seat. The vehicle glove box 1 is a compartment that has an inner space capable of housing goods. As shown in FIG. 2, the vehicle glove box 1 includes a storage unit 10, a first lid or door 20, a damper unit 30 and a second lid 40.

<<Storage Unit 10>>

A shown FIG. 2, the storage unit 10 includes a body part 11 and an attachment part 12, which are integrally formed together as a unitary member. The body part 11 and the attachment part 12 cooperate to define a storage body which supports the first and second lids 20, 40 thereon.

The body part 11 has a shape of a housing that allows storage of goods therein. The body part 11 has a smaller width at a front end thereof than at a middle and a rear end thereof. As shown in FIG. 2, the body part 11 has a first or primary opening 11a on a rear side thereof. The first opening 11a is slanted in such a manner that it approaches the front of the vehicle as it goes downward. As shown in FIG. 3, the body part 11 includes a second opening 11b and a pair of holes (horizontal slots) 11c, 11c formed therein. The second opening is also referred to herein as an equipment access opening. The second opening 11b is formed in a position extending from a front face 11f of the body part 11 to an upper face 11u thereof (See FIGS. 4A and 4B). The pair of holes 11c, 11c are located side by side in a transverse direction of the vehicle at areas adjacent to the lower edge of the second opening 11b. As shown in FIG. 2, the body part 11 has a guide portion 11d formed thereon and extending upright from an outside face on the right side of the body part 11.

The attachment part 12 is a part for securing and fixing the vehicle glove box 1 to the instrument panel IP. As shown in FIG. 2, the attachment part 12 includes a pair of flange portions 12a, 12a, a pair of clip portions 12b, 12b and a hole 12c. The pair of flange portions 12a, 12a extend in parallel to each other in the transverse direction of the vehicle from the rear end of the body part 11. The pair of clip portions 12b, 12b are provided side by side on a front face of the right flange portion 12a in a longitudinal direction thereof. The hole 12c is formed through the right flange portion 12a. The clip portions 12b are press-fit into holes (not shown) formed in the vicinity of the opening of the instrument panel IP for securing and fixing the vehicle glove box 1 to the instrument panel IP.

<<First Lid 20>>

The first lid 20 is a lid for opening and closing the first opening 11a of the body part 11 of the storage unit 10. The first lid 20 is pivotally supported at lower ends of the respective flange portions 12a, 12a. As shown in FIG. 2, the first lid 20 includes a lid body 21 and an arm 22. The arm 22 has an arc-shape and extends from a right end area of an inner face of the lid body 21. The arm 22 extends through the hole 12c that is formed through the right flange portion 12a. The arm 22 has a tip portion to which is attached a string member 32a extending from the top end of a damper body 31.

<<Damper Unit 30>>

The damper unit 30 is a member for damping an abrupt action of opening the first lid 20. As shown in FIG. 2, the damper unit 30 includes the damper body 31 and the string member 32. The damper body 31 is, for example, an air damper and is attached to a right edge on the front end of the storage unit 10. The string member 32 is passed through the guide portion 11d and connects the arm 22 of the first lid 20 and the damper body 31 with each other.

<<Second Lid 40>>

Figure 5A:
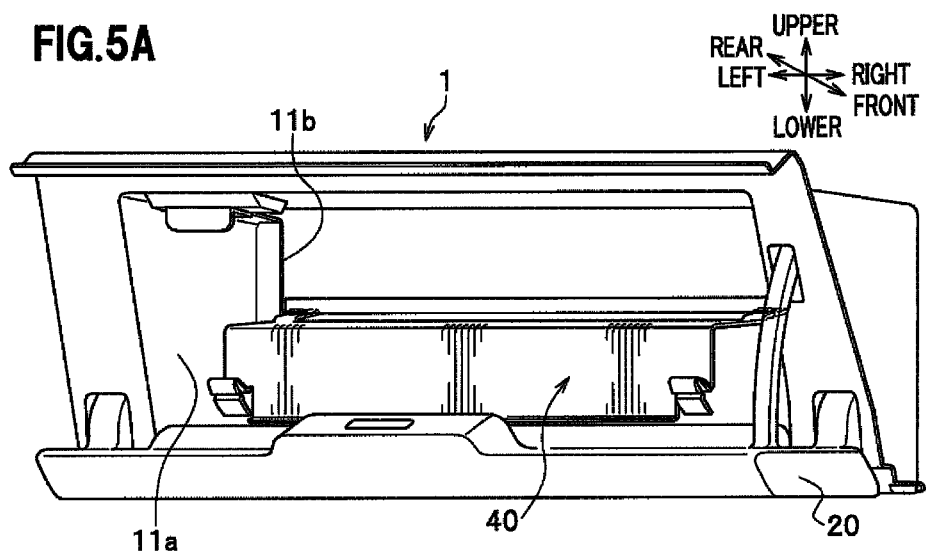
FIGS. 5A and 5B are views showing the opened state of the second lid; a view in which the second lid is seen from the rear of the vehicle (FIG. 5A) and a cross sectional view in which the second lid is seen from the right side thereof (FIG. 5B).
Figure 5B:
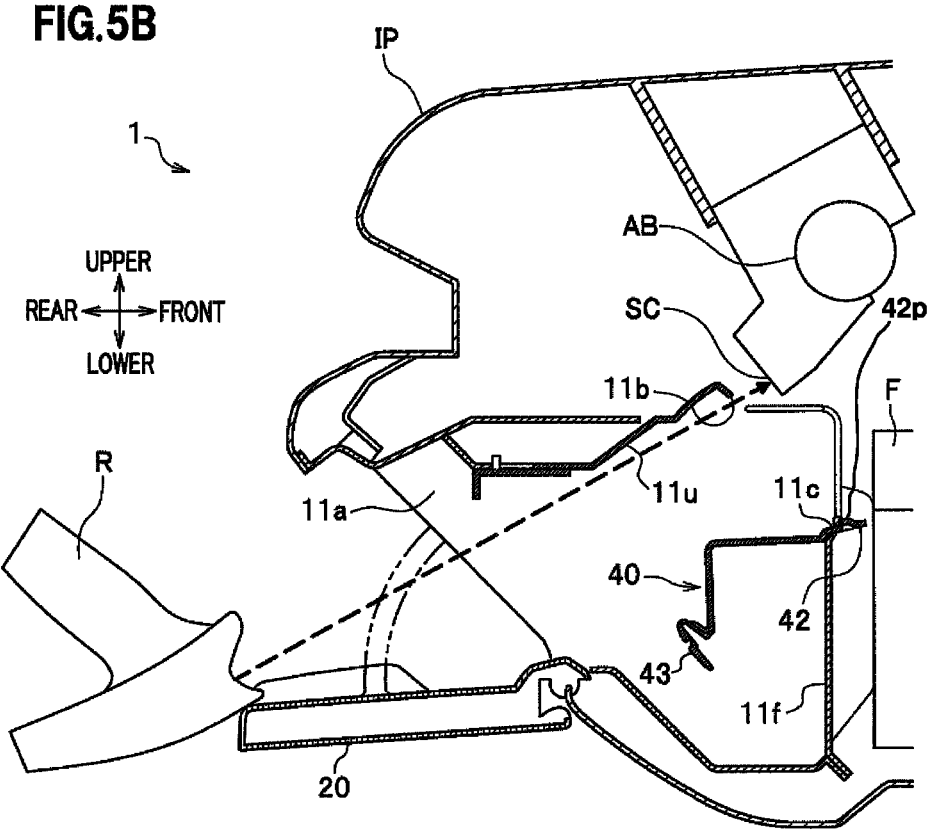

The second lid 40 is a lid movable for opening and closing the equipment access opening 11b formed through the body part 11 of the storage unit 10. The second lid 40 is pivotally supported at the areas of the storage unit 10 adjacent to the lower edge of the second opening 11b of the body part 11. As shown in FIG. 3, the second lid 40 includes a lid body 41, hook portions 42 and a pair of spaced apart, flexibly resilient tabs 43 which are integrally formed as part of the lid 40, and which have recessed grooves 43g formed respectively therein. The lid body 41 is formed in an inverted L-shape as viewed in a side view thereof, and has a bend that conforms to the shape of the second opening 11b. The hook portions 42 are an example of fit portions to fit in the holes 11c formed through the storage unit 10. The hook portions 42 are formed on a lower edge of the lid body 41 to be inserted through the holes 11c of the storage unit 10. More specifically, the hook portions 42 have respective projections 42p formed integrally thereon, which extend forwardly with the second lid 40 in the closed state and upwardly with the second lid 40 in the opened state. The projections 42p are pressed on peripheral areas of the respective holes 11c of the body part 11 of the storage unit 10 with the second lid 40 in the opened state. As shown in FIG. 5B, the projections 42p are configured to act as stop members to limit pivotal movement of the second lid 40 in the opened state thereof. The tabs 43 are formed on an upper edge of the lid body 41 to be engaged with an upper edge of the second opening 11b of the storage unit 10.

<Use Example>

Figure 4A:
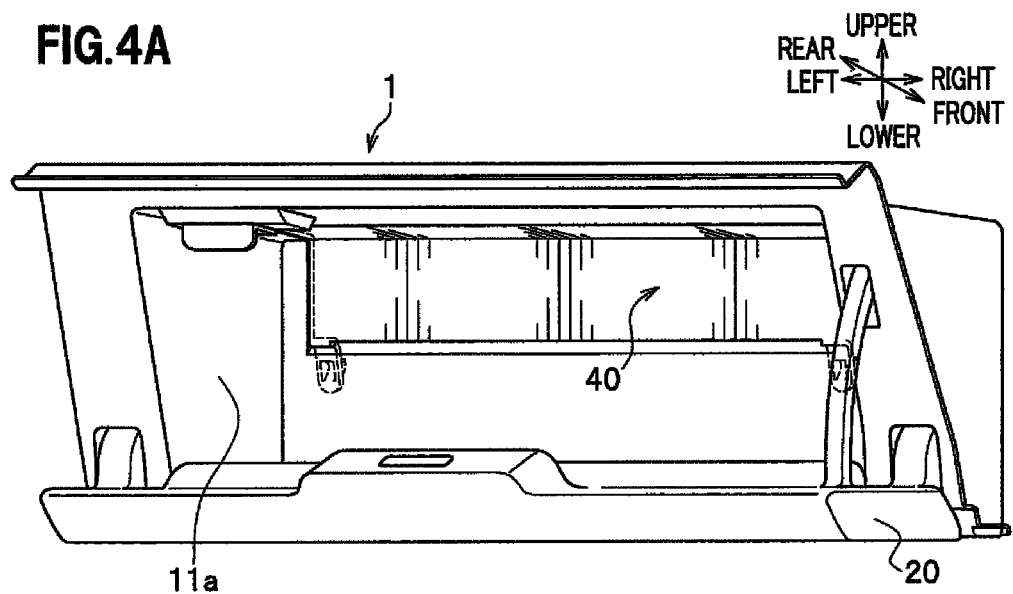
FIGS. 4A and 4B are views showing the closed state of the second lid; a view in which the second lid is seen from the rear of the vehicle (FIG. 4A) and a cross sectional view in which the second lid is seen from a right side thereof (FIG. 4B).
Figure 4B:
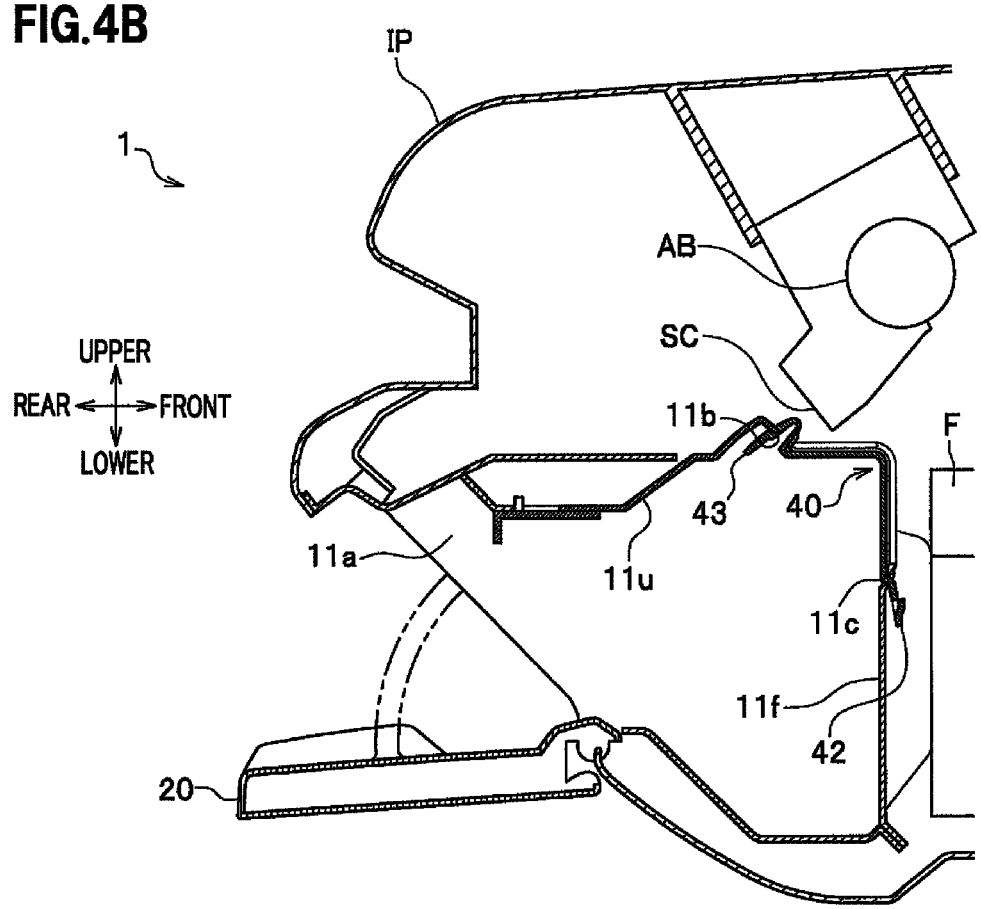

Now, description will be made of a use example of the vehicle glove box 1 according to the embodiment with reference of FIGS. 4A-5B. FIGS. 4A and 4B are views showing the closed state of the second lid; a view in which the second lid is seen from the rear of the vehicle (FIG. 4A) and a cross sectional view in which the second lid is seen from a right side thereof (FIG. 4B). FIGS. 5A and 5B are views showing the opened state of the second lid; a view in which the second lid is seen from the rear of the vehicle (FIG. 5A) and a cross sectional view in which the second lid is seen from the right side thereof (FIG. 5B). In FIGS. 4A-5B, the first lid 20 is in its opened state, and illustration of the guide portion 11d and the damper unit 30 is omitted.

As shown in FIG. 4B, according to the vehicle of the embodiment, the instrument panel IP has an air conditioner filter F and a front-passenger seat airbag device AB installed therein. The filter F is configured to be detachable for the replacement thereof. The airbag device AB has a rear face with a serial code SC thereon. In general, the filter F is installed in front of the front face 11f of the vehicle glove box 1. The serial code SC of the airbag device AB is located above the front edge of the upper face 11u of the vehicle glove box 1. In other words, the second opening 11b of the storage unit 11 is formed to face both the air conditioner filter F and the serial code SC of the airbag device AB.

<<At Normal Times>>

As shown in FIG. 4A, the second lid 40 is closed at normal times. That is, as shown in FIG. 4B, the hook portions 42 of the second lid 40 are inserted through the holes 11c, and the tabs 43 are engaged with the upper edge of the second opening 11b. In this state, the filter F and the airbag device AB are invisible from a vehicle passenger, and the vehicle passenger is able to store goods into the vehicle glove box 1.

<<At the Time of Replacing the Filter F and Reading of the Serial Code SC>>

As shown in FIG. 5A, the second lid 40 is opened at the time of replacing the filter F and reading of the serial code SC. That is, as shown in FIG. 5B, the vehicle passenger or a vehicle worker opens the first lid 20, and then elastically deforms the tabs 43 of the second lid 40 to get the tabs 43 out of the engagement with the upper end of the second opening 11b and to open the second lid 40. In this state, the filter F and the airbag device AB are visible through the first opening 11a and the second opening 11b from the vehicle passenger so that the vehicle passenger or worker can replace the filter F or read the serial code SC with a reader R.

In the meanwhile, reading of the serial code SC is carried out after mounting of the instrument panel IP with the glove box 1 therein into the vehicle on a factory assembly line. Data obtained by the reading of the serial code SC is stored into a computer's memory in relation to the number of the vehicle.

During the reading of the serial code SC, the second lid 40 is held on the body part 11 of the storage unit 10 by the hook portions 42 thereof pressing on peripheral areas of the respective holes 11b. Thus, according to the vehicle glove box 1 of the embodiment, the second lid 40 will not drop off from the body part 11 of the storage unit 10, which prevents loss of the second lid 40.

Further, according to the vehicle glove box 1 of the embodiment, at the time of replacing the filter F and reading of the serial code SC, the vehicle passenger or worker turns the lid 40 using the hook portions 42 as a pivot to open the lid 40, and after the replacement of the filter F or the reading of the serial code SC, turns the lid 40 back in position using the hook portions 42 as a pivot to close the lid 40. Thus, it is easy to open and close the second lid 40.

Moreover, according to the vehicle glove box 1 of the embodiment, the second lid 40 is turned with the lower edge used as a pivotal axis. In the opened state of the second lid 40, gravity keeps the hook portions 42 fitting in the holes 11c formed through the body part 11 of the storage unit 10, so that the second lid 40 stays out of the way of replacement of the filter F and reading of the serial code SC.

While an embodiment has been described referring to the accompanying drawings, it is to be understood that the invention is not limited thereto and that variations and changes may be made without departing from the spirit or scope of the invention. For example, the location of the second opening 11b may be changed properly according to the configuration of the filter F and the serial code SC. Further, the instrument panel IP may have any shape that allows replacement of the filter F and reading of the serial code SC with the vehicle glove box 1 installed therein and with the first lid 20 and the second lid 40 both opened.

EXPLANATION OF REFERENCES 1 vehicle glove box
10 storage unit
11b second opening (opening)
11c hole
20 first lid
30 damper
40 second lid (lid)
42 hook portion (fit portion)
AB airbag device
F filter
IP instrument panel
SC serial code

The invention claimed is:

1. A vehicle instrument panel having an airbag device mounted therein, an air conditioner filter disposed therein below the airbag device, and a glove box installed therein and comprising a storage unit for receiving goods to be stored therein, the storage unit including:
a hollow storage body having a primary opening formed in a rear end thereof, and an equipment access opening formed in a forward end thereof adjacent the airbag device; and
a lid for attaching to the storage body and opening and closing the equipment access opening, the storage unit being configured and arranged such that the equipment access opening faces both the air conditioner filter and a serial code of the airbag device,
wherein with the lid in an open position, a line-of-sight exists from a position rearward of the primary opening to the serial code of the airbag device, the line-of-sight passing through the primary opening and the equipment access opening.

2. The vehicle instrument panel of claim 1, wherein the storage body has a hole formed therein and the lid has a fit hook portion for fitting in the hole, the fit hook portion fitting in the hole and cooperating with the storage body to form a hinge for allowing the lid to pivotally move in relation to and to be held on the storage body with the lid in an opened state thereof.

3. The vehicle instrument panel of claim 2, wherein the equipment access opening is formed in a position extending from a front face of the storage body to an upper face thereof, and wherein the hook portion has a projection formed integrally thereon, said projection extending forwardly with the lid in the closed state and extending upwardly with the lid in the opened state, and configured to act as stop member to limit pivotal movement of the lid in the opened state thereof.

4. The vehicle instrument panel of claim 3, wherein the fit hook portion is formed on a lower edge of the lid.

5. The vehicle instrument panel of claim 1, wherein the storage unit further comprises a door pivotally attached to a lower rear side of the storage body for opening and closing the primary opening of the storage body.

6. The vehicle instrument panel of claim 1, wherein the lid has an inverted L-shape as viewed in side view, and is configured to be pivotally movable relative to the storage body.

7. The vehicle instrument panel of claim 5, wherein the lid comprises a plurality of integrally formed flexibly resilient tabs positioned to engage with a portion of the storage body when the lid is in a closed state.

8. The vehicle instrument panel of claim 5, further comprising a damper operatively attached to the door for damping an action of opening the door.

9. The vehicle instrument panel of claim 1, wherein the air conditioner filter is removable through the equipment access opening and further through the primary opening with the lid in an open position.

10. The vehicle instrument panel of claim 1, wherein the air conditioner filter is detachable and can be accessed through the primary opening and further through the equipment access opening with the lid in the open position and the door in an open position.

11. A vehicle comprising:
an instrument panel having an airbag device mounted therein, the airbag device having a rear face with a serial code thereon;
an air conditioner filter disposed in the instrument panel below the airbag device; and
a glove box installed in the instrument panel and including a storage unit for receiving goods to be stored therein, the storage unit comprising:
a hollow storage body having a primary opening formed in a rear end thereof, the storage body having an equipment access opening formed in a forward end thereof adjacent the airbag device,
a door for opening and closing the primary opening, and
a lid for opening and closing the equipment access opening, the storage unit being configured and arranged such that the equipment access opening faces both the air conditioner filter and a serial code of the airbag device and wherein, with the door in an open position and the access lid in an open position:
a line-of-sight exists from a point rearward of the primary opening to the serial code on the airbag device such that the serial code can be read by a reader; and
the air conditioning filter can be accessed, removed and replaced via the equipment access opening.

12. The vehicle of claim 11, wherein:
the equipment access opening is formed in a position extending from a front face of the storage body to an upper face thereof;

the lid has an inverted L-shape such that it fits into the equipment access opening with the lid in a closed state;

the storage body has a plurality of spaced apart slots formed therein, and the lid has a plurality of fit hook portions extending outwardly at an edge portion thereof for respectively fitting into the slots, the fit hook portions cooperating with the storage body to form a hinge for allowing the lid to pivotally move in relation to and to be held in an open position on the storage body; and the lid has at least one integrally formed, flexibly resilient tab for securing the top, rear portion of the lid to the storage unit in a closed position thereof.

13. The vehicle of claim 11, wherein the door is pivotally attached to a rear, bottom portion of the storage body such that when the door is opened, a top edge of the door pivots downwardly relative to the storage body.

14. The vehicle of claim 12, wherein:

the equipment access opening is formed in a position extending from a front face of the storage body to an upper face thereof and the flexibly resilient tab has a recessed groove formed therein to engage with an upper edge of the equipment access opening of the storage unit when the lid is in a closed position.

15. The vehicle of claim 11, wherein the lid has an inverted L-shape as viewed in side view, and is configured to be pivotally movable relative to the storage body.

16. The vehicle instrument panel of claim 2, wherein the fit hook portion has a projection thereon for engaging a front face of the storage body when the lid is in an open position, the projection configured to act as a stop member to limit pivotal movement of the lid in the opened state thereof.

17. The vehicle of claim 12, wherein each of the fit hook portions, respectively, has a projection thereon for engaging a front face of the storage body when the lid is in an open position, the projections configured to act as stop members to limit pivotal movement of the lid in the opened state thereof.

18. The vehicle of claim 12, wherein the air conditioning filter has a top portion and is disposed to extend vertically in front of the glove box such that the top portion of the air conditioning filter can be accessed via the equipment access opening.

* * * * *